United States Patent
Nour et al.

(10) Patent No.: US 10,435,172 B2
(45) Date of Patent: Oct. 8, 2019

(54) AIRCRAFT COMPRISING A DISPLAY DEVICE FOR THE ATTITUDE OF AN AIRCRAFT WITH RESPECT TO A FIXED DIRECTION IN SPACE

(71) Applicant: LEONARDO S.p.A., Rome (IT)

(72) Inventors: Pierre Abdel Nour, Samarate (IT); Paolo Brughera, Samarate (IT); Fabio Monti, Samarate (IT)

(73) Assignee: LEONARDO S.p.A., Rome (IT)

( * ) Notice: Subject to any disclaimer, the term of this patent is extended or adjusted under 35 U.S.C. 154(b) by 128 days.

(21) Appl. No.: 15/555,928

(22) PCT Filed: Mar. 11, 2016

(86) PCT No.: PCT/IB2016/051409
§ 371 (c)(1),
(2) Date: Sep. 5, 2017

(87) PCT Pub. No.: WO2016/147090
PCT Pub. Date: Sep. 22, 2016

(65) Prior Publication Data
US 2018/0037335 A1 Feb. 8, 2018

(30) Foreign Application Priority Data

Mar. 13, 2015 (EP) .................................. 15159097

(51) Int. Cl.
*B64D 45/00* (2006.01)
*G01C 9/00* (2006.01)
(Continued)

(52) U.S. Cl.
CPC ............. *B64D 45/00* (2013.01); *G01C 5/005* (2013.01); *G01C 9/005* (2013.01); *G01C 9/02* (2013.01);
(Continued)

(58) Field of Classification Search
CPC .... B64D 45/00; B64D 2045/007; G01C 9/02; G01C 5/005; G01C 9/005; G01C 9/10; G08B 7/062
See application file for complete search history.

(56) References Cited

U.S. PATENT DOCUMENTS 44,451 A * 9/1864 Pender .................... G01C 17/00
33/355 R
1,277,748 A * 9/1918 Owen ...................... G01C 9/36
33/390

(Continued)

FOREIGN PATENT DOCUMENTS

EP 0 116 022 8/1984
EP 0828657 3/1998
(Continued)

*Primary Examiner* — Justin Seo
*Assistant Examiner* — Tania C Courson
(74) *Attorney, Agent, or Firm* — Leason Ellis LLP

(57) ABSTRACT

A display device for displaying the attitude of an aircraft with respect to a fixed direction in space is described, said device comprising: a first element that can be fastened to the aircraft; and a second element, which is free to move with respect to the first element, following a change in position of first element with respect to the fixed direction; the second element in turn comprising: a mass, which is designed to return the second element to the same stable position with respect to the fixed direction when the first element changes its position with respect to the fixed direction; and a visual indication, which is representative of the position of the fixed direction, as the position of the first element changes.

13 Claims, 7 Drawing Sheets

(51) Int. Cl.
*G01C 9/10* (2006.01)
*G01C 5/00* (2006.01)
*G01C 9/02* (2006.01)
*G08B 7/06* (2006.01)

(52) U.S. Cl.
CPC .......... *G01C 9/10* (2013.01); *B64D 2045/007* (2013.01); *G08B 7/062* (2013.01)

(56) References Cited

U.S. PATENT DOCUMENTS

| | | | | |
|---|---|---|---|---|
| 1,361,367 A | * | 12/1920 | Coxey | G01C 9/10 33/351 |
| 2,600,644 A | * | 6/1952 | Hand | G01D 11/28 250/463.1 |
| 2,645,030 A | * | 7/1953 | Mahone | G01C 9/36 33/390 |
| 2,677,193 A | * | 5/1954 | Truppe | G01C 9/20 33/396 |
| 3,937,078 A | * | 2/1976 | Williams | G01C 9/00 73/170.15 |
| 4,029,994 A | * | 6/1977 | Iwans | H05B 37/029 315/132 |
| 4,347,499 A | | 8/1982 | Burkman, Sr. et al. | |
| 4,513,509 A | * | 4/1985 | Nordstrom | G01C 23/005 33/328 |
| D280,187 S | * | 8/1985 | Nordstrom | D10/65 |
| 4,670,988 A | * | 6/1987 | Baxter | G01C 17/18 33/333 |
| 4,878,054 A | * | 10/1989 | Reynaud | G01C 23/005 340/975 |
| 5,187,871 A | * | 2/1993 | McDermott | B63C 11/12 2/430 |
| 5,961,072 A | * | 10/1999 | Bodle | A62B 3/00 244/118.5 |
| 6,099,136 A | | 8/2000 | Becnel | |
| 7,089,674 B1 | | 8/2006 | Hendon | |
| 7,603,961 B2 | * | 10/2009 | Mayenschein | G01C 3/32 116/200 |
| 7,800,511 B1 | * | 9/2010 | Hutchison | G08B 7/066 340/3.1 |
| 8,376,567 B1 | * | 2/2013 | Zozula | F21S 8/032 315/312 |
| 8,732,970 B2 | * | 5/2014 | Gomez Acevedo | G01B 21/22 33/1 N |
| 8,952,828 B2 | * | 2/2015 | Kohlmeier-Beckmann | A62B 3/00 340/425.5 |
| 8,970,354 B2 | * | 3/2015 | Lewis | G08B 7/066 340/332 |
| 9,222,770 B1 | * | 12/2015 | Miller | G01C 9/10 |
| 9,576,459 B2 | * | 2/2017 | Park | G08B 7/066 |
| 2007/0069882 A1 | * | 3/2007 | Mahajan | E05B 65/104 340/500 |
| 2007/0103329 A1 | * | 5/2007 | Lin | G08B 7/066 340/691.1 |
| 2009/0066522 A1 | * | 3/2009 | Lee | G08B 5/36 340/577 |
| 2010/0193633 A1 | | 8/2010 | Budinger et al. | |
| 2013/0027901 A1 | * | 1/2013 | Martin | C09D 5/22 362/23.01 |
| 2013/0326894 A1 | | 12/2013 | Miller | |
| 2018/0148193 A1 | * | 5/2018 | Ozmeral | B64D 43/00 |

FOREIGN PATENT DOCUMENTS

| | | |
|---|---|---|
| FR | 2 838 402 | 10/2003 |
| GB | 120 625 | 11/1918 |

* cited by examiner

AIRCRAFT COMPRISING A DISPLAY DEVICE FOR THE ATTITUDE OF AN AIRCRAFT WITH RESPECT TO A FIXED DIRECTION IN SPACE

CROSS REFERENCE TO RELATED APPLICATIONS

The present application is a U.S. National Phase of International Patent Application PCT/IB2016/051409, filed on Mar. 11, 2016, which claims priority to European Application No. 15159097.3, filed on Mar. 13, 2015, each of which is incorporated by reference as if expressly set forth in their respective entireties herein.

TECHNICAL FIELD

The present invention relates to an aircraft, in particular a helicopter, comprising a display device for displaying the attitude of the aircraft with respect to a fixed direction in space.

BACKGROUND ART

The term attitude is used in the following description to indicate the orientation of a direction integral with the aircraft with respect to the fixed direction in space.

In the event of the helicopter ditching, it is of fundamental importance to ensure the safe and orderly evacuation of the passengers and crew through the helicopter's emergency exits.

To this end, lighting systems are provided that are designed to indicate the correct path to follow for reaching the emergency exits.

Nevertheless, is has been found that in the event of ditching, human panic can result in confused and irrational behaviour of the helicopter's occupants.

This can cause catastrophic consequences even in cases where the necessary safety equipment, such as lifejackets and floatation systems, are duly present on board the helicopter.

The situation becomes even the more problematic in the case where, after ditching, the helicopter has an upside-down attitude or a half-overturned attitude on the water. In fact, in these circumstances, the helicopter's occupants have difficulty in perceiving the attitude of the helicopter and reaching the emergency exits in an orderly manner.

Moreover, in the event of ditching at night or in conditions of poor visibility, the situation is rendered even more difficult by the fact that the emergency lighting systems intended to indicate the correct route to the emergency exits might have been damaged by the impact upon ditching.

In consequence, the need is felt within the industry to facilitate correctly abandoning the helicopter in the event of it ditching, especially when the helicopter is upside down or resting on one side.

There is particular awareness of above-indicated need in the event of ditching at night or in conditions of poor visibility.

EP-B-0828657 describes an emergency lighting system for a path leading to an emergency exit for an aircraft. The lighting system comprises a pair of photoluminescent strips mounted on the floor, which run along a first direction and are separated from each other to define the path for the aircraft's passengers.

U.S. Pat. No. 6,099,136 describes an emergency escape lighting system, which is chemically activated and placed close to a corner of a helicopter door defining the emergency exit. More specifically, the system comprises two chemical agents, which when mixed together form a compound that radiates light. The agents are stored in a container, which comprises two distinct and separated chambers. When the system is activated, the volume of the chambers is reduced, thereby forcing the agents into a mixing chamber. The compound then flows through a transparent conduit which extends around the escape exit.

US 2010/0193633 describes a lighting system for an aircraft exit. The lighting system is mounted on the floor in a position adjacent to the exit and comprises a light source.

U.S. Pat. No. 7,089,674 discloses a gyroscope and, more particularly, an angle measuring gauge for motorcycles and the like.

US-A-2013/326894 discloses a gradient measuring assembly for use in conjunction with excavating machinery to indicate to a user the slope angle of an excavating vehicle as positioned on a surface being excavated or graded.

FR-A-2838402 discloses an aircraft according to the preamble of claim 1.

DISCLOSURE OF INVENTION

The object of the present invention is to provide an aircraft, comprising a display device that satisfies at least one of the above-indicated needs in a simple and inexpensive manner.

The above-mentioned object is achieved by the present invention, in so far as it relates to an aircraft, as claimed in claim 1.

BRIEF DESCRIPTION OF THE DRAWINGS

For a better understanding of the present invention a preferred embodiment is described below, purely by way of non-limitative example and with reference to the accompanying drawings, in which.

BEST MODE FOR CARRYING OUT THE INVENTION

Figure 1:
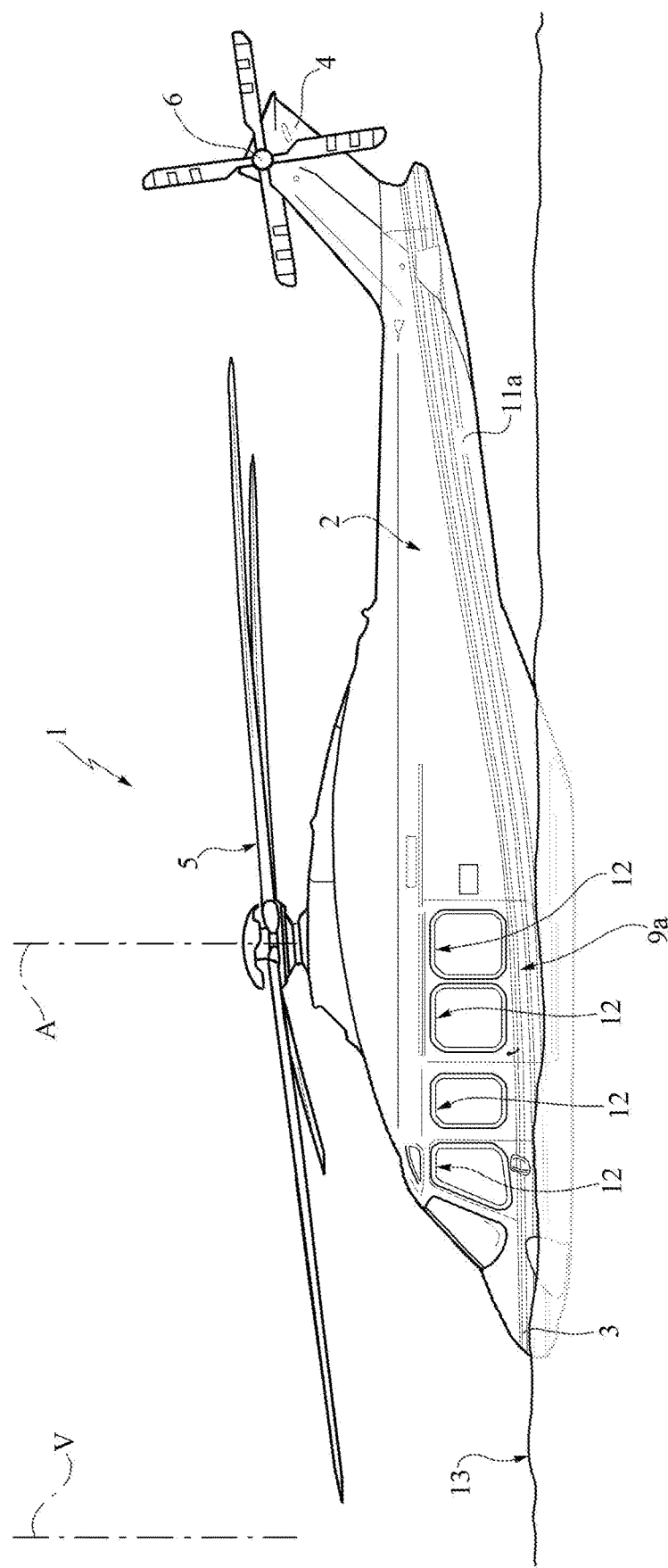
FIG. 1 is a side view of a helicopter comprising a display device according to the invention, in a first attitude and in ditching conditions.

Referring to FIG. 1, reference numeral 1 indicates an aircraft.

In particular, the aircraft is capable of hovering and, in the case shown, is a helicopter, hereinafter referred to in this description by reference numeral 1.

The helicopter 1 comprises:
- a fuselage 2, which has a nose 3 and a tail fin 4 at opposite ends;
- a main rotor 5, which rotates about an axis A and protrudes above the fuselage 2; and
- a tail rotor 6 protruding from the tail fin 4 of the fuselage 2.

Figure 8:
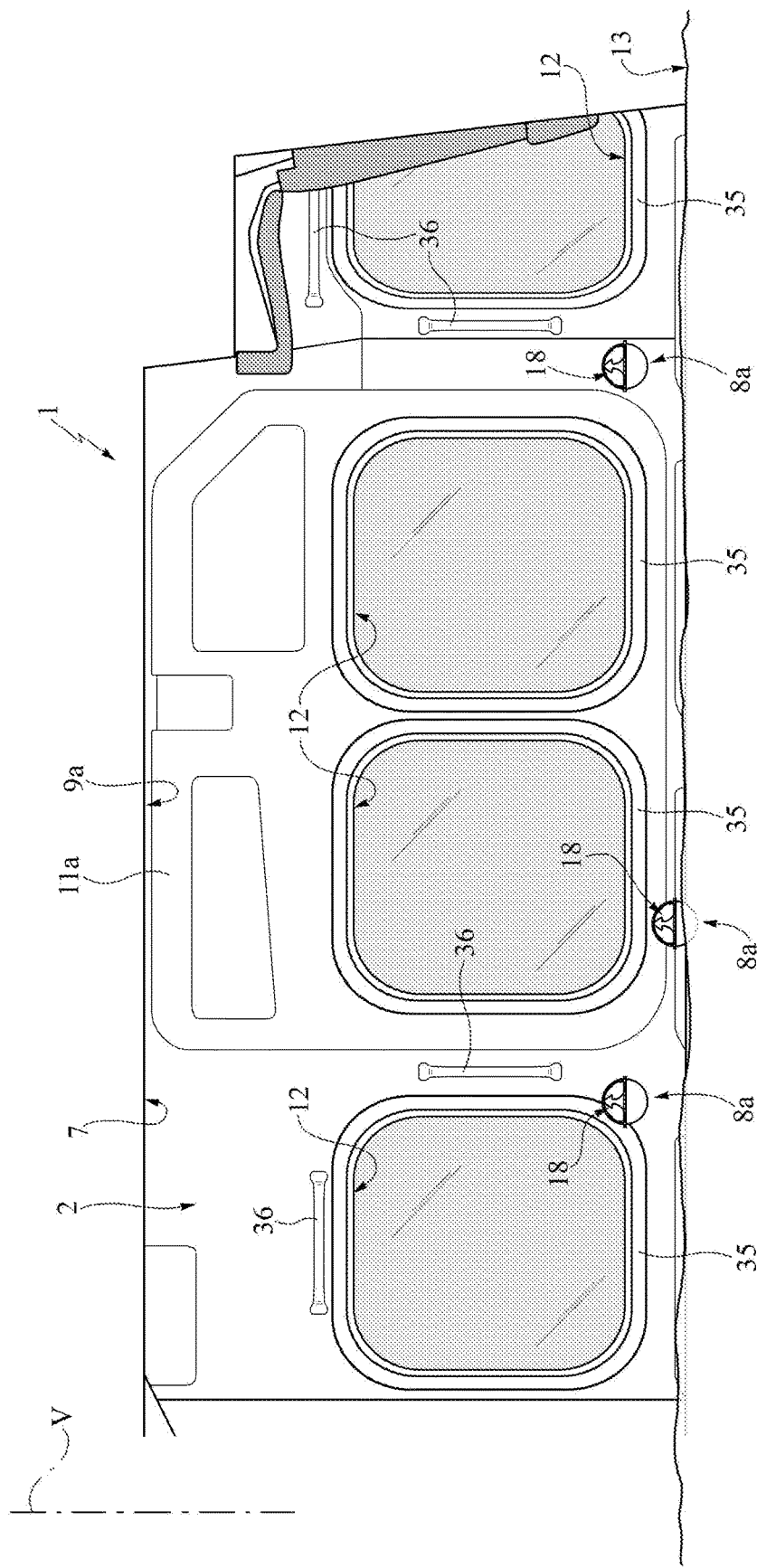
FIG. 8 shows the display device in FIGS. 2 and 3, and the helicopter positioned in the third attitude of FIG. 7, with parts removed for clarity.

The fuselage 2 defines a cabin 7 (FIGS. 4, 6 and 8) delimited by two sides 11a and 11b opposite to each other and each defining a plurality of emergency exits 9a and 9b.

The sides 11a and 11b define a plurality of respective windows 12.

In particular, axis A is integral with the helicopter.

Referring to FIG. 1, a first attitude of the helicopter 1 is shown in ditching conditions.

In this first attitude, the lower part of the fuselage 2 opposite to the main rotor 5 is resting on the waterline 13, the main rotor 5 is above the fuselage 2 and axis A lies on a same vertical plane in a fixed vertical direction V with respect to the helicopter 1.

In this first attitude, the sides 11a and 11b and the respective emergency exits 9a and 9b are at the same height.

Therefore, in this first attitude, both emergency exits 9a and emergency exits 9b can be used by the occupants of the cabin 7 in order to abandon the helicopter 1.

Figure 5:
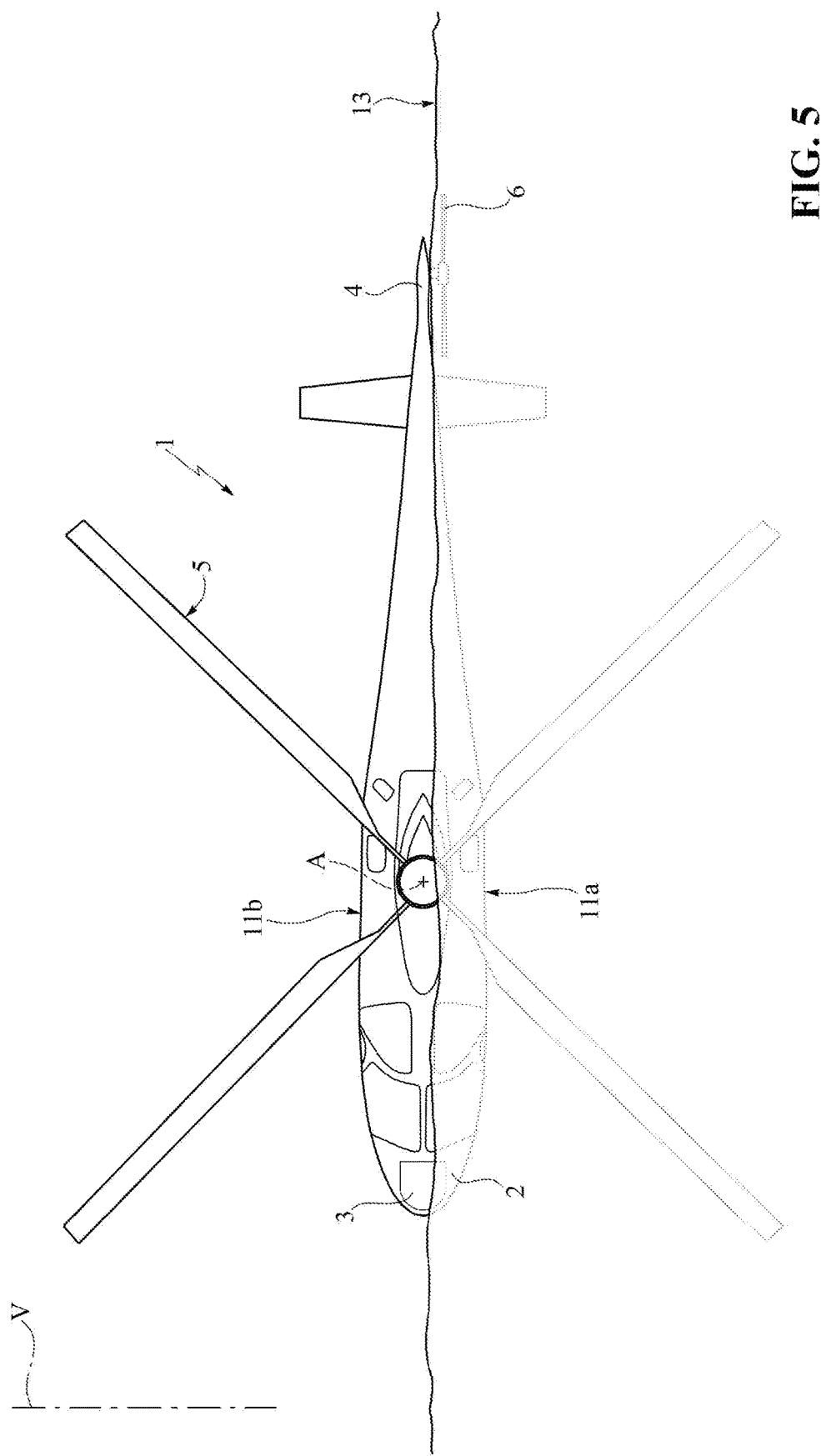
FIG. 5 shows a second attitude of the helicopter in FIG. 1, in ditching conditions.

Referring to FIG. 5, a second attitude of the helicopter 1 is shown in the ditching phase. In this second attitude, the helicopter 1 is laying on one side and axis A 6 substantially orthogonal to direction V.

In this second attitude in the ditching phase, side 11a and the respective emergency exits 9a are beneath the waterline 13, while side 11b and the respective emergency exits 9b are higher up than side 11a and emergency exits 9a.

Therefore, emergency exits 9a cannot be used by the occupants of the helicopter 1 to abandon it, while emergency exits 9b can be used by the occupants of the helicopter 1 to abandon it.

Figure 7:
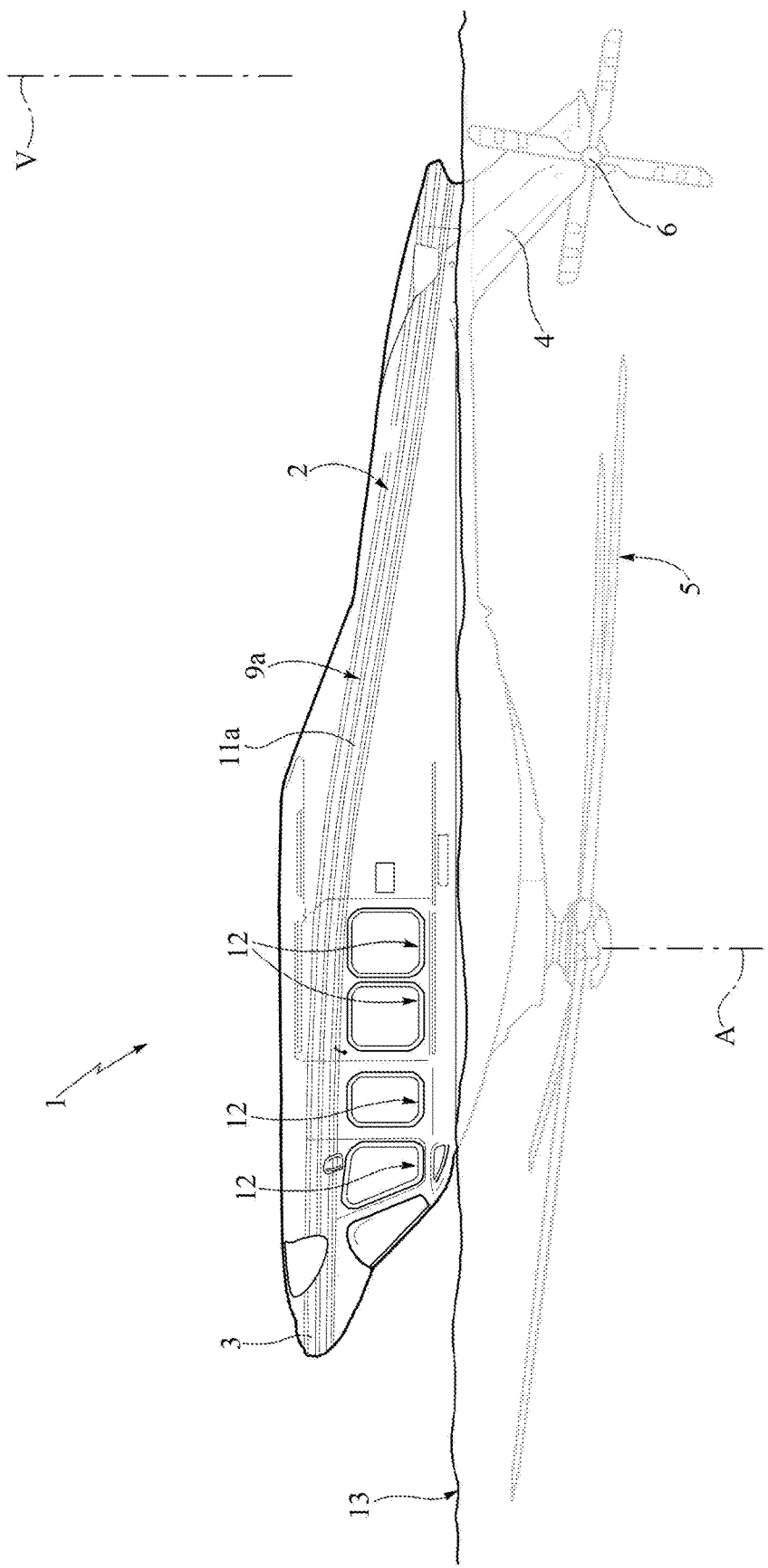
FIG. 7 shows a third attitude of the helicopter di FIG. 1, in ditching conditions.

Referring to FIG. 7, a third attitude of the helicopter 1 is shown in the ditching phase.

In this third attitude, the helicopter 1 is substantially upside down, the main rotor 5 is below the fuselage 2 and axis A and direction V lie on a vertical plane.

In this third attitude, the sides 11a and 11b and the respective emergency exits 9a, 9b are at the same height.

Therefore, in this third attitude, both emergency exits 9a and emergency exits 9b cannot be used by the occupants of the cabin 7 to abandon it.

It is important to underline that in the event of ditching, the helicopter 1 naturally tends to assume the first, second or third attitude, according to the position of its centre of gravity.

Figure 6:
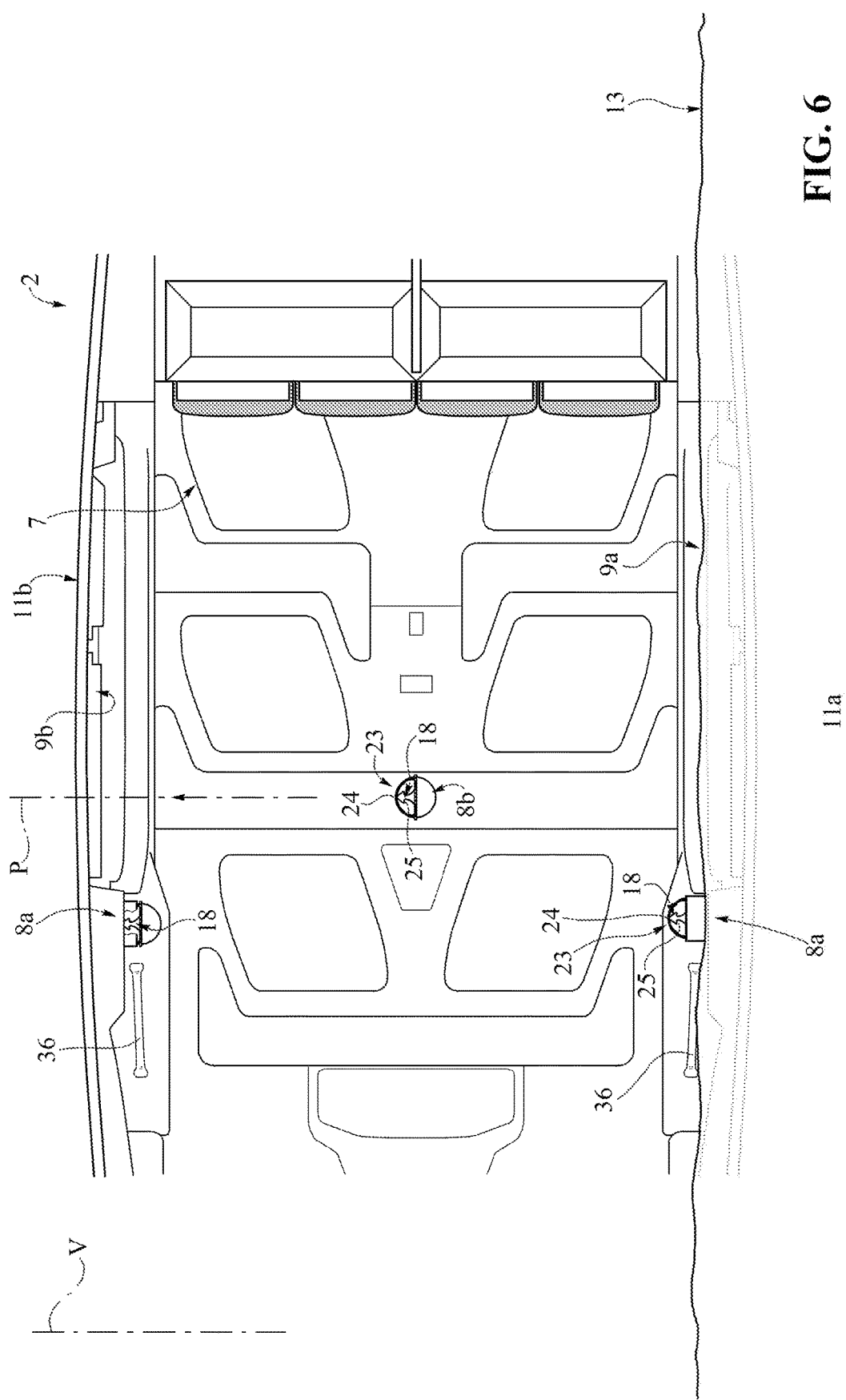
FIG. 6 shows the display device in FIGS. 2 and 3 and the helicopter positioned in the second attitude of FIG. 5, with parts removed for clarity.

The cabin 7 also houses a plurality of display devices 8a and 8b, which are provided to:
- display the position of the vertical direction V in a stable manner, as the attitude of the helicopter 1 changes in ditching conditions, so as to indicate the attitude of the helicopter 1 to the occupants; and/or
- display an exit path P, running from the unusable emergency exits 9a towards the usable emergency exits 9b when the helicopter is in second attitude in ditching conditions, i.e. side 11a and emergency exit 9a are lying in the water (FIGS. 5 and 6).

In particular, display devices 8a are mounted on the sides 11a and 11b and are located adjacent to the borders 35 of the respective emergency exits 9a and 9b.

Display devices 8b are mounted inside the cabin 7 in positions set apart from the sides 11a and 11b.

Preferably, display devices 8b are located along a median direction of the cabin 7, which is equidistant from the sides 11a and 11b and substantially orthogonal to axis A.

In this description, only one device 8a and 8b will be described in the following, as all the devices 8a and 8b are identical.

Figure 2:
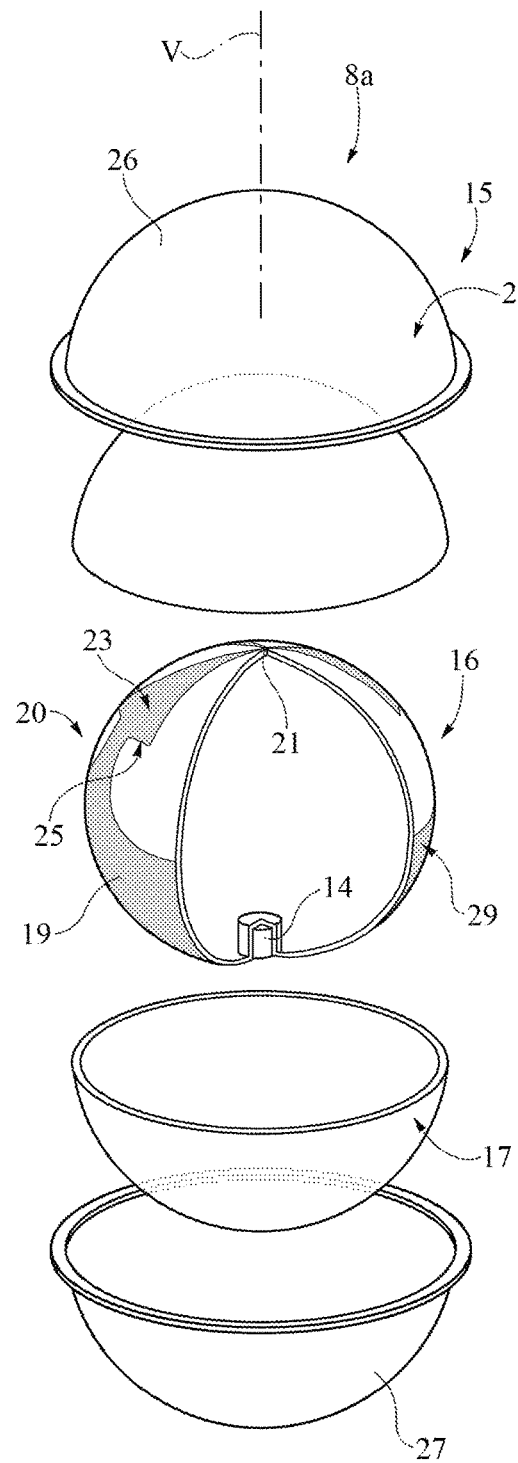
FIG. 2 is an exploded perspective view of the display device according to the invention.
Figure 3:
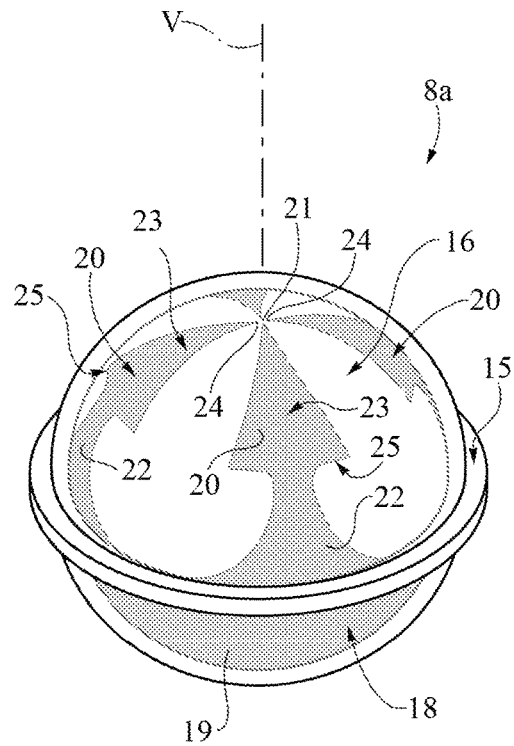
FIG. 3 is a perspective view of the display device in FIG. 2, in the configuration for mounting on the helicopter.

Advantageously, the device 8a and 8b comprises (FIGS. 2 and 3):
- a fixed element 15 mounted in the cabin 7 of the helicopter 1; and
- an element 16 that is free to move with respect to element 15, following changes in the attitude of the helicopter 1;

In turn, element 16 comprises:
- a mass 14 designed to stably return element 16 to the same position and hold it there with respect to direction V, when element 15 changes its position with respect to direction V due to a change in the attitude of the helicopter 1; and
- a visual indication 18, which represents the orientation of direction V, as the position of element 15 changes with respect to direction V.

In the case shown, elements 15 and 16 are mutually concentric spheres and are delimited by respective mutually concentric spherical surfaces 28 and 29.

Element 15 is transparent and concentrically surrounds element 16.

In other words, element 16 is suspended inside element 15.

The mass 14 is positioned below the geometric centre of element 16, i.e. the centre of spherical surface 29, so as to place the centre of gravity of element 16 beneath the geometric centre of spherical surface 29 and ensure the stable return of element 16 to the same position with respect to direction V for any attitude of the helicopter 1.

The device 8a and 8b further comprises a liquid film 17, which is interposed between elements 15 and 16 and is designed to allow reciprocal movement between elements 15 and 16.

In the case shown, the liquid film 17 is transparent and, in particular, is formed by oil.

More precisely (FIG. 2), element 15 is made of two semi-spheres 26 and 27 connected to each other in a manner such that they can be dismantled to allow the insertion of element 16.

The visual indication 18 is defined by spherical surface 29 and comprises (FIG. 3):
- a portion 19 shaped like a hemispherical surface; and
- a plurality of portions 20, four in the case shown, shaped like arrows, which project from portion 19 and converge towards a vertex 21 of element 16.

Portion 19 is positioned below portion 20, when element 16 is returned to the stable position.

In particular, portion 19 houses the mass 14.

Proceeding from portion 19 to vertex 21, each portion 20 comprises:
- a segment 22 of progressively smaller width; and
- a segment 23 shaped substantially like an isosceles triangle with the base 25 on the side of segment 22 and the vertex 24, opposite to the base 25, adjacent to or coincident with vertex 21.

Figure 4:
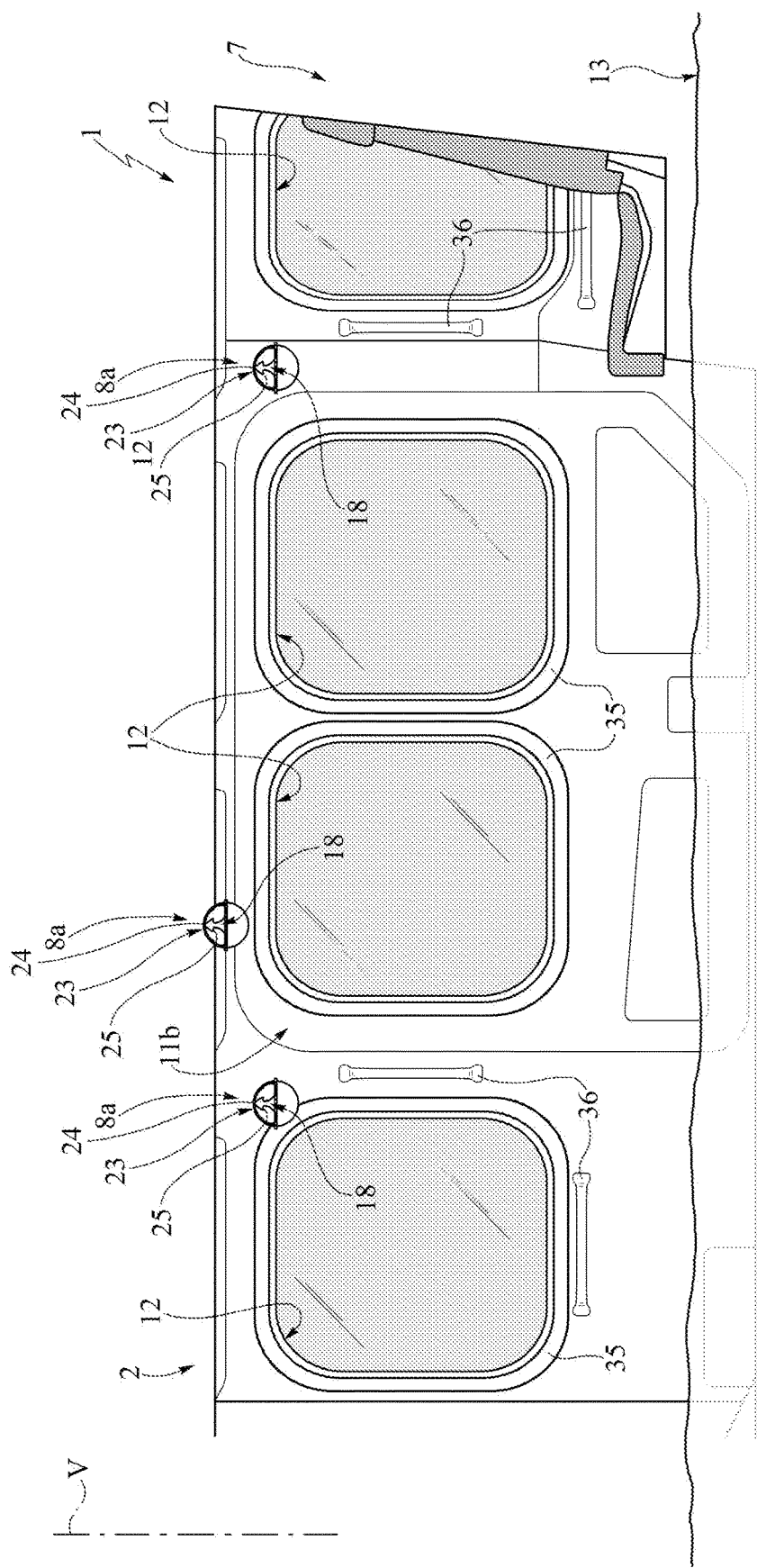
FIG. 4 shows the display device in FIGS. 2 and 3 and the helicopter positioned in the first attitude of FIG. 1, with parts removed for clarity.

As visible in FIG. 4, segment 23, when projected on the cabin 7, is positioned parallel to direction V and with the vertex 24 above the base 25.

In greater detail, the visual indication 18 is made of a photoluminescent material or painted with a photoluminescent material.

As visible in FIG. 5, when the helicopter is in the second attitude in ditching conditions, the sides 11a and 11b are opposite to each other along direction V.

More precisely, side 11a is beneath the waterline 13 and emergency exits 9a are consequently unusable, while side 9b is above both the waterline 13 and side 9a, and so emergency exits 9b are usable.

Segments 23 of the visual indications 18 of the devices 8a, 8b display the exit path P (FIG. 6), which extends parallel to direction V and from side 9a, positioned below and unusable, towards side 9b, positioned above and usable.

More specifically, the bases 25 of segments 23 are positioned on the side of sides 11a, while the vertices 24 of segments 23 are positioned on the side of sides 11b.

The border 35 surrounding each emergency exit 9a, 9b is made of or painted with a photoluminescent material.

Finally, the helicopter 1 comprises a plurality of handles 36 surrounding some of the windows 12 and made of or painted with a photoluminescent material.

The operation of only one of the display devices 8a and 8b will be described in the following, as these display devices 8a and 8b are identical.

More precisely, as the attitude of the helicopter 1 changes (FIGS. 1, 5 and 7) in ditching conditions:
- element 15, which is constrained to the cabin 7, changes its position with respect to the fixed direction V in accordance with the first, second or third attitude of the helicopter 1; and
- element 16, which is suspended inside element 15, returns to a fixed stable position with respect to the fixed direction V, due to the presence of the mass 14 in a position below the geometric centre of surface 29 of element 16.

The relative movement of elements 15 and 16 is enabled by the liquid film 17.

In greater detail (FIGS. 2 to 4, 6 and 8), independently of the attitude of the helicopter 1 with respect to direction V, element 16 stably returns to a position in which the projection of segment 23 of the visual information 18 on sides 11a and 11b of the cabin 7 substantially defines a triangle with the vertex 24 positioned above the base 25 and the height parallel to direction V.

In this way, segment 23 visually indicates the vertical direction V for each of the first, second or third attitudes of the helicopter 1 to the occupants of the cabin 7.

It follows that the occupants of the cabin 7 can easily identify the exit path P for each attitude of the helicopter 1 in ditching conditions.

Moreover, when sides 11a and emergency exits 9a of the helicopter 1 are beneath the waterline 13 and sides 11b and emergency exits 9b are above sides 11a, as in the second attitude (FIG. 6), the vertices 24 of segments 23 are positioned above the respective bases 25 in parallel with direction V.

In this way, segments 23 of the visual indications 18 of devices 8a and 8b define the exit path P, which points from the unusable emergency exits 9a towards the usable emergency exits 9b.

It follows that the occupants of the cabin 7 are thus guided towards emergency exits 9b and the situation of occupants attempting to abandon the helicopter 1 via emergency exits 9a, which are below the waterline 13, is avoided.

The photoluminescent material or paint of the visual indication 18 of element 16 absorbs daylight and remains visible in the event of poor visibility.

In this way, in the event of ditching at night or in conditions of poor visibility, the visual information 18 remains visible to the occupants of the helicopter 1, indicating both the vertical direction V and the exit path P even in these conditions.

The borders 35 surrounding the windows 12 and the handles 36 surrounding the emergency exits 9a and 9b and made of or painted with a photoluminescent material, also contribute to facilitating the orderly evacuation of the occupants of the helicopter in the event of ditching at night or in conditions of poor visibility.

From examination of the helicopter 1 made according to the present invention, the advantages that it can provide are evident.

In particular, as the attitude of the helicopter 1 changes and, in consequence, the position of the element 15 fastened to the cabin 7 with respect to the fixed vertical direction V in the case shown, the mass 14 returns element 16 to a stable position in which the visual indication 18 indicates the orientation of direction V.

It follows that in the event of ditching, the visual indication 18 indicates the position of the helicopter 1 with respect to direction V to the occupants of the cabin 7 in a clear and simple manner for all attitudes of the helicopter 1.

In this way, in the event of the helicopter 1 ditching and for all attitudes of the helicopter 1, the device 8a and 8b facilitates correct and orderly abandonment of the cabin 7 by the occupants through the usable emergency exits 9a and/or 9b.

The risk of confused and irrational behaviour of the occupants in the cabin 7 is thus substantially reduced, with a consequent reduction in the risk of the ditching having catastrophic results.

Element 15, which externally surrounds element 16, is made of a transparent material to enable seeing the visual indication 18 from the outside of element 15 and inside the cabin 7.

The liquid film 17 is transparent and interposed between elements 15 and 16 to enable both visibility of the visual indication 18 from the outside of element 15 and relative movement between elements 15 and 16.

As the attitude of the helicopter 1 changes, the mass 14 returns element 16 to a stable position in which segment 23 substantially defines, in projection on the sides 11a and 11b, a triangle with:
- the vertex 24 positioned above the base 25; and
- the height located parallel to direction V.

It follows that segment 23, projected on the sides 11a and 11b, appears to the occupants as an upward pointing arrow, for all attitudes of the helicopter 1.

Thus, the triangle defined by segment 23 of each display device 8a and 8b defines a clear and immediately perceivable indication for the occupants of the position of the helicopter 1 with respect to fixed direction V.

The visual indication 18 is made of a photoluminescent material, so as to absorb daylight and remain visible at night or in poor lighting conditions.

Thus, the display device 8a and 8b indicates direction V to the occupants of the cabin 7, even at night or in poor lighting conditions, facilitating ditching operations in such situations.

Furthermore, the display devices 8a and 8b are particularly advantageous in indicating the exit path P directly from emergency exits 9a to emergency exits 9b, in the case where the helicopter 1 has the second attitude (FIG. 5) in ditching conditions, namely with side 11a below the waterline 13 and side 11b above the waterline 13.

In fact, in these conditions, emergency exits 9a of sides 11a are unusable as they are obstructed by water and emergency exits 9b of sides 11b are usable.

More precisely, in these conditions, the vertices 24 of segments 23 are located on the side of the usable emergency exits 9b and the associated bases 25 are located on the side of the unusable emergency exits 9a.

It follows that the triangles defined by segments 23 of the display devices 8a and 8b form the exit path P, which points from the unusable emergency exits 9a towards the usable emergency exits 9b.

Abandonment of the helicopter 1 is thus facilitated when the latter has the second attitude after ditching.

Finally, the borders 35 and handles 36 are made of or painted with a photoluminescent material, to further indicate the presence of the emergency exits 9a and 9b and facilitate orderly abandonment of the helicopter 1 in the event of ditching at night or in conditions of poor visibility.

In conclusion, it is evident that modifications and variants can be made to aircraft 1 described and illustrated herein without departing from the scope defined in the claims.

In particular, the display devices 8a and 8b could be applied to a fixed-wing aeroplane or a convertiplane instead of to a helicopter 1.

Element 16 could be located outside of element 15.

The mass 14 might not be present and, in this case, element 16 could have a non-homogeneous distribution of mass such that its centre of gravity is below the geometric centre of surface 29.

The invention claimed is:

1. An aircraft (1) comprising:
   a fuselage (2);
   a first and a second lateral side (11a and 11b) opposite to each other;
   a first emergency exit (9a) defined by said first side (11a);
   a second emergency exit (9b) defined by said second side (11b); and
   at least one display device (8a, 8b) for displaying the attitude of said aircraft (1) with respect to a fixed direction (V) in space;
   wherein the at least one display device (8a, 8b) comprises:
   a first element (15), which can be fastened to said aircraft (1); and
   a second element (16), which is free to move with respect to the first element (15), following a change in position of said first element (15) with respect to said fixed direction (V);
   said second element (16) in turn comprising:
   a mass (14), which is designed to return said second element (16) to the same stable position with respect to said fixed direction (V), when said first element (15) changes, in use, its position with respect to said fixed direction (V); and
   a visual indication (18), which is representative of the position of said fixed direction (V), as the position of said first element changes (15);
   in the event of said aircraft (1) ditching with said first side (11a) positioned below or resting on the waterline (13), said second emergency exit (9b) being usable and positioned at a higher level than said first emergency exit (9a), which is unusable;
   said visual indication (18) of said display device (8a or 8b) displaying an exit path (P), pointing from said unusable first emergency exit (9a) towards said usable second emergency exit (9b);
   wherein the at least one display device comprises: at least one first display device (8a) that is located adjacent to one of said first emergency exit (9a) and said second emergency exit (9b) and mounted on one of said first lateral side (11a) and said second lateral side (11b); and/or
   at least one second display device (8b) is housed inside said fuselage (2) of said aircraft (1) in a position set apart from said first lateral side (11a) and said second lateral side (11b).

2. An aircraft according to claim 1, characterized in that said first element (15) and second element (16) are rotatable with respect to each other.

3. An aircraft according to claim 1, characterized in that said first and second elements (15, 16) have at least one common axis of symmetry.

4. An aircraft according to claim 3, characterized in that said first and second elements (15, 16) are delimited by respective portions of spherical surfaces (28, 29) concentric to each other.

5. An aircraft according to claim 1, characterized in that said second element (16) is placed inside said first element (15);
   said first element (15) being transparent to allow said visual indication (18) to be visible from outside the first element (15).

6. An aircraft according to claim 5, characterized in that said first element (15) is made in two separate portions (26, 27) connected together.

7. An aircraft according to claim 1, characterized in that said visual indication (18) is at least partially made of a photoluminescent material.

8. An aircraft according to claim 1, characterized in that said visual indication (18) comprises a segment (23) shaped substantially like a triangle;
   said segment (23) in turn comprising a base (25) and a vertex (24 opposite to each other, and having, in said stable position of said second element (16), a height substantially parallel to said fixed direction (V);
   said vertex (24) being located, in said stable position of said second element (16), above said base (25).

9. An aircraft according to claim 1, wherein the at least one display device (8a, 8b) further includes a liquid film (17), which is interposed between said first and second elements (15, 16).

10. An aircraft device according to claim 9, characterized in that said liquid film (17) is transparent.

11. An aircraft according to claim 1, characterized in that said mass (14) is positioned below the centre of gravity of said second element (16), so as to stably return said second element (16) to the same position with respect to said fixed direction (V), as the position of said first element (15) changes.

12. An aircraft according to claim 1, wherein a border (35) of at least one window (12) of said first lateral side (11a) and said second lateral side (11b) is at least partially made of or painted with a photoluminescent material.

13. An aircraft according to claim 1, further including at least one handle (36) adjacent to said emergency exit (9a, 9b) and made of or painted with a photoluminescent material.

* * * * *